US012509202B2

(12) United States Patent
Guerche et al.

(10) Patent No.: US 12,509,202 B2
(45) Date of Patent: Dec. 30, 2025

(54) COMMUNICATION DEVICE COMPRISING A MOUTHPIECE

(71) Applicant: 52 HERTZ, Boulogne-Billancourt (FR)

(72) Inventors: Jonas Guerche, Boulogne-Billancourt (FR); Gabriel Guerche, Boulogne-Billancourt (FR); Dylan De Crignis, Ecole Valentin (FR)

(73) Assignee: 52 HERTZ, Plouzané (FR)

(*) Notice: Subject to any disclaimer, the term of this patent is extended or adjusted under 35 U.S.C. 154(b) by 0 days.

(21) Appl. No.: 18/708,960

(22) PCT Filed: Nov. 10, 2022

(86) PCT No.: PCT/EP2022/081448
§ 371 (c)(1),
(2) Date: May 9, 2024

(87) PCT Pub. No.: WO2023/083952
PCT Pub. Date: May 19, 2023

(65) Prior Publication Data

US 2024/0417047 A1 Dec. 19, 2024

(30) Foreign Application Priority Data

Nov. 10, 2021 (FR) ........................................ 2111974

(51) Int. Cl.
*B63C 11/26* (2006.01)
*A62B 18/08* (2006.01)
(Continued)

(52) U.S. Cl.
CPC ............ *B63C 11/26* (2013.01); *A63B 71/085* (2013.01); *B63C 11/186* (2013.01); *H04R 1/028* (2013.01); *H04R 1/08* (2013.01); *A62B 18/08* (2013.01)

(58) Field of Classification Search
CPC ......... B63C 11/186; B63C 11/26; H04R 1/08; H04R 1/083; H04B 11/00; A63B 71/085
See application file for complete search history.

(56) References Cited

U.S. PATENT DOCUMENTS 156,599 A 11/1874 Schmitz
4,230,106 A * 10/1980 Geeslin ................. B63C 11/186 128/207.16
(Continued)

FOREIGN PATENT DOCUMENTS

EP 0122878 * 10/1984
FR 2650987 A * 2/1991 ............. B63C 11/26
FR 2796916 A1 * 2/2001 ........... B63C 11/186

OTHER PUBLICATIONS

International Search Report as issued in International Patent Application No. PCT/EP2022/081448, dated Jan. 2, 2023.
(Continued)

*Primary Examiner* — Kathryn E Ditmer
(74) *Attorney, Agent, or Firm* — Pillsbury Winthrop Shaw Pittman LLP

(57) ABSTRACT

A communication device includes a mouthpiece intended to be worn in the mouth of a subject including an acoustic conduction plate intended to be bitten by the user; and a vibrating element configured to convert an audio input into an acoustic output, the vibrating element being coupled to the acoustic conduction plate so as to transmit said acoustic output to the plate.

11 Claims, 5 Drawing Sheets

(51) Int. Cl.

| | |
|---|---|
| ***A63B 71/08*** | (2006.01) |
| ***B63C 11/18*** | (2006.01) |
| ***H04R 1/02*** | (2006.01) |
| ***H04R 1/08*** | (2006.01) |

(56) References Cited

U.S. PATENT DOCUMENTS 5,299,936 A * 4/1994 Ueno ........................ A61C 7/08 433/34
5,455,842 A * 10/1995 Mersky ................... B63C 11/26 381/151
5,493,079 A * 2/1996 Anderson .............. G10K 11/22 181/127
5,579,284 A * 11/1996 May ......................... H04R 1/14 340/850
5,706,251 A * 1/1998 May ......................... H04R 1/14 340/850
5,868,130 A * 2/1999 Stier ....................... B63C 11/22 128/205.24
6,089,225 A * 7/2000 Brown ................ B63C 11/2227 128/205.24
2003/0151979 A1* 8/2003 Pierot ..................... B63C 11/26 367/132
2008/0257358 A1* 10/2008 Stern ................... A61M 16/208 128/200.24
2011/0048422 A1* 3/2011 Millard ................. B63C 11/186 128/205.24
2011/0186054 A1* 8/2011 Boyd ......................... A61F 5/37 128/846
2012/0213034 A1* 8/2012 Imran .................... H04B 11/00 367/132
2017/0238850 A1* 8/2017 Gonzales ............... A61B 5/682
2017/0319129 A1* 11/2017 Shah .................... A61N 1/0548
2019/0001187 A1* 1/2019 Costella ............. A63B 71/0622

OTHER PUBLICATIONS

Written Opinion of the International Searching Authority as issued in International Patent Application No. PCT/EP2022/081448, dated Jan. 2, 2023.

* cited by examiner

COMMUNICATION DEVICE COMPRISING A MOUTHPIECE

CROSS-REFERENCE TO RELATED APPLICATIONS

This application is the U.S. National Stage of PCT/EP2022/081448, filed Nov. 10, 2022, which in turn claims priority to French patent application number 2111974 filed Nov. 10, 2021. The content of these applications are incorporated herein by reference in their entireties.

INVENTION FIELD

The invention relates to a mouthpiece, in particular a mouthpiece for a diving regulator, suitable for underwater communication.

STATE OF THE ART

Communication between two divers is made difficult by the fact that the aquatic environment is a poorer conductor of waves than air.

Documents US2012/0213034 and U.S. Pat. No. 5,706,251A, both describing a mouthpiece for a regulator mouthpiece to be placed in the mouth, comprising a microphone and a bone-conduction earpiece vibrating an acoustic conduction plate to pass the signal through the user's teeth.

A first shortcoming of this type of device is that bone conduction of the acoustic signal is not optimal. A second defect is that the signal captured is hardly intelligible due to the labial part of the mouthpiece preventing the user from moving their lips sufficiently.

The invention offers a mouthpiece that resolves the aforementioned drawbacks of the prior art.

SUMMARY OF THE INVENTION

According to one aspect, the invention relates to a communication device comprising a mouthpiece intended to be worn in the mouth of a subject comprising an acoustic conduction plate intended to be bitten by the user; and a vibrating element configured to convert an audio input into an acoustic output, the vibrating element being coupled to the acoustic conduction plate so as to transmit said acoustic output to said plate.

The advantage is to conduct the acoustic signal through the diver's teeth to create a bone conduction earpiece.

In one embodiment, the acoustic conduction plate intended to be bitten by the subject comprises a plurality of ridges.

An advantage is that the ridges of the plate fill the cavity at the top of the tooth.

In one embodiment, the conduction plate comprises an elastic coating and the thickness of the elastic coating at a top of a ridge is less than the thickness of the elastic coating between two ridges. One advantage is to provide an ideal compromise between bone conduction and user comfort.

In one embodiment, the vibrating element is arranged to vibrate in one direction; and said vibrating element is encapsulated between at least one or at least two stop walls arranged to transmit the vibrations of the vibrating element to the acoustic conduction plate in said direction.

The direction of vibration is preferably substantially parallel to the plane of the acoustic conduction plate.

An advantage is to improve the transmission of the acoustic signal to the teeth of the diver while avoiding shocks of the vibrating element against the conduction plate.

In another alternative mode, the direction of vibration is preferably substantially perpendicular to the plane of the acoustic conduction plate.

In one embodiment, the vibrating element is encapsulated between.

- a first stop wall arranged to transmit the vibrations of the vibrating element in said direction of vibration to the acoustic conduction plate and
- a second wall substantially parallel to the first wall; characterized in that the device comprises a layer of absorbent material between the vibrating element and the second wall.

In one embodiment, the mouthpiece is a regulator mouthpiece, and includes a microphone for capturing the subject's voice.

In one embodiment, the regulator mouthpiece further comprises a labial portion to accommodate the user's lips; two air passage lumens through the labial portion and a recess in the labial portion between the two air passage lumens.

One advantage is to provide a recess substantially in the center of the labial part to improve the freedom of movement of the lips, and thus improve the intelligibility of the signal received.

In one embodiment, the microphone is arranged between the openings of the two lumens.

In one embodiment, the regulator mouthpiece further comprises a labial portion for receiving the user's lips; and a lumen for passing air through the labial portion and formed at least in part by the walls of the labial portion.

In one embodiment, said labial portion of the device is designed so that said walls of the labial portion are deformable between:

- a first configuration in which the opposite walls of the labial portion are not in contact, so as to allow air to pass through the air passage lumen 6 and
- a second configuration in which the opposite walls of the labial portion are in contact.

In one embodiment, the outer surfaces of the lip walls have a concave shape at rest.

An advantage of the deformable labial walls with a concave shape is that they reduce the force to be applied by the user to close the lips.

The intelligibility and comfort of the user are thus promoted.

In one embodiment, the device comprises an armature comprising:

- a first portion intended to be connected to a regulator;
- a second portion connected to the acoustic conduction plate;
- at least one rigid lateral connection arm extending from the first portion to the second portion of the armature.

In one embodiment, the labial walls extend from the first portion to the second portion of the armature by covering the lateral connecting arm.

In one embodiment, the first portion and the second portion each comprise an annular section from which the labial walls extend.

In one embodiment, the labial walls are configured to be deformed to accommodate a flow of air passing through the air passage lumen.

In one embodiment, the labial portion comprises two opposite labial walls, each intended to be in contact with a lip of the user.

In one embodiment, the microphone is at least partially integrated into the elastic coating of the mouthpiece.

In one embodiment, the mouthpiece further comprises signal transmission means connected to the vibrating element and/or to the microphone, such as electronic cables or an electronic ribbon cable.

Said transmission means can be integrated at least partially inside the elastic coating of the mouthpiece.

In one embodiment, the device further comprises signal transmission means electrically connected to the vibrating element and/or to the microphone by an electrical ribbon cable, in which the electrical conduction sheet is bonded to an armature comprising the conduction plate and covered by overmolding with an elastic coating.

DETAILED DESCRIPTION OF THE INVENTION

Figure 1:
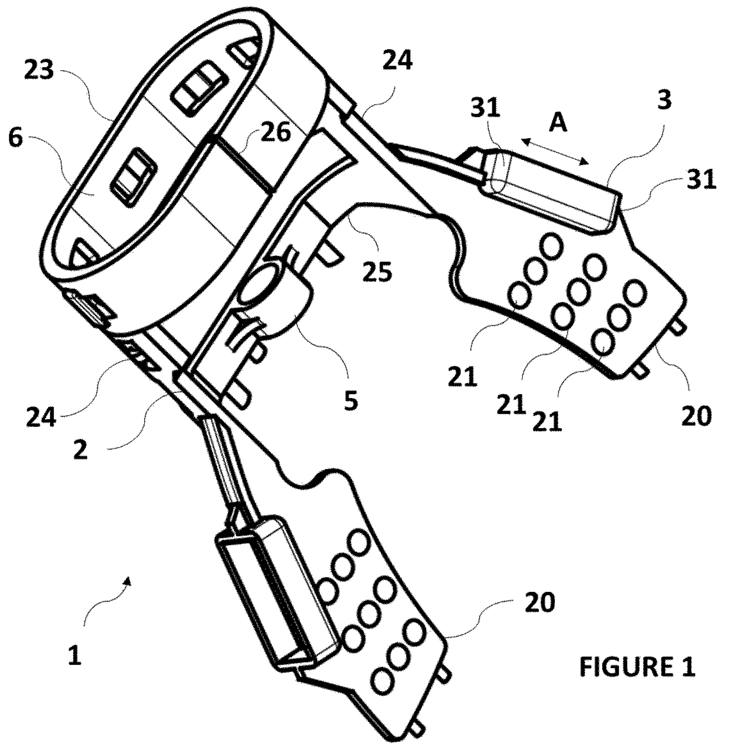
FIG. 1 represents the armature of a regulator mouthpiece designed to be placed in a users mouth from a perspective view in accordance with an embodiment of the invention.

An embodiment of the invention is described below with reference to FIG. 1 representing the armature of a regulator mouthpiece designed to be placed in a user's mouth from a perspective view.

The elastic coating is not shown in this figure for the sake of clarity.

Armature

The mouthpiece 1 includes a armature 2.

The armature 2 preferably comprises an elastic coating (not shown). The elastic coating advantageously improves user comfort. Preferably, the elastic coating is obtained by overmolding the armature.

The armature comprises a first connection portion 6 designed to cooperate with equipment such as a diving regulator. Preferably, this first portion 6 comprises an annular shape.

The armature also comprises at least one, preferably two, conduction plates 20 designed to be bitten by the user.

The first portion 6 of the armature is mechanically connected to at least one side arm 24. This connection advantageously ensures the rigidity of the mouthpiece between the intraoral part (second portion) and the part connected to the regulator (first portion).

The mouthpiece 1 comprises a labial portion 42.

The labial portion 42 is intended to be covered by the lips of the user during use.

Said labial portion 42 includes a lumen 6 allowing the passage of air on either side of the labial portion.

Advantageously, this lumen 6 allows the passage of air from the channel of the regulator towards the mouth of the subject during use.

The labial portion 42 makes it possible to create with the user's lips a tight seal between the external environment and the air passage lumen 6.

Preferably, the labial portion is arranged between the first portion of the armature 23 and the conduction plates 20.

The labial portion 42 extends between a breathing zone comprising the acoustic conduction plates 20 and a connection means 43.

The connection means 43 advantageously allows the mouthpiece to cooperate with a diving regulator.

Preferably, the connection means 43 is of tubular shape whose walls are rigid.

As illustrated in FIG. 1, the connection means forms, with the armature 2, a single piece and can be connected to each other by one arm 24 or two arms 24.

Figure 10:
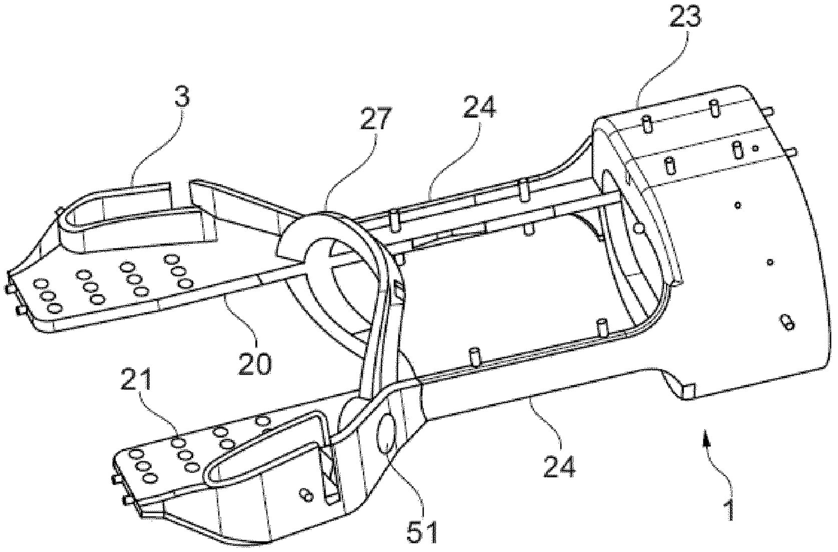
FIG. 10 represents an embodiment of the armature of the regulator mouthpiece.

As illustrated in FIG. 10, the armature may comprise a second annular portion 27 defining the entry of the lumen 6 allowing the passage of air.

The labial portion is then defined between the first portion 6 and the second portion 27.

The armature may also include a connection bar 25 between the two arms 24.

This connection bar, in an embodiment illustrated in FIG. 1, includes a location for receiving the microphone 5.

In another alternative embodiment illustrated in FIG. 10, the armature includes a location 51 for receiving the microphone arranged on a lateral side of one of the conduction plates 20.

The coating may include an overmolding of the armature 2.

In particular, the overmolded coating may include labial walls 41 intended to be placed between the user's teeth and lips.

The mouthpiece 1 may include a slot 26.

The slot 26 can extend along a connection means 43.

The slot 26 advantageously allows the section of the connection means 43 to be deformed, for example to be able to cooperate with different models of regulators.

The air passage lumen 6 thus extends through the labial portion 42 and through the connection means 43.

The armature 2 comprises at least one acoustic conduction plate 20.

The acoustic conduction plate 20 is arranged so as to be bitten by the user wearing the mouthpiece 1.

Vibrating Element

The mouthpiece 1 further comprises a vibrating element of the transducer type.

The vibrating element is connected to the conduction plate so as to transmit the vibrations of the vibrating element to the acoustic conduction plate.

The vibrating element 3 is configured to convert audio input to acoustic output and acoustically couple to the upper and/or lower teeth of the diver to conduct the acoustic output from the upper teeth of the diver through the skull to propagate the acoustic signal up to the diver's inner ear via the skull and jaw bones when the diver wears the mouthpiece in the mouth.

Bone Conduction with the User

The acoustic conduction plate 20 is designed and arranged to acoustically couple to the upper teeth of the user to conduct the acoustic output of the upper teeth of the diver through the skull to the cochlea to generate audible sound in at least one of the diver's inner ears when the diver wears the mouthpiece 1.

The acoustic conduction plate 20 is configured to acoustically engage and couple with the surface of the diver's teeth and is configured to conduct the vibrations of the vibrating element 3 in response to an electrical signal. Vibration of the vibrating element 3 produces an acoustic output signal which is acoustically conducted to the diver's teeth, via the acoustic conduction plate, and then through the bones of his jaw and skull to the inner ear, including the cochlea, where it is perceived as sound.

The material of the acoustic conduction plate 20 may include a ceramic, a metal or metal alloy, or a polymer material such as a resilient polymer. The acoustic conduction plate may have a size and shape allowing acoustic coupling with one or more teeth of the plunger.

In particular embodiments, the acoustic conduction plate 20 may have a curved horizontal shape corresponding in part to the curvature of the dental arches of the diver to facilitate contact of the acoustic conduction plate 20 with several teeth.

The acoustic conduction plate 20 may also have one or more ridges or pads or other raised features 21 configured to improve acoustic coupling and conduction with the teeth of the plunger.

In particular embodiments, the ridges or studs 21 can be positioned to come into contact with the central depressions of the teeth of the plunger.

The acoustic conduction plate 20 preferably comprises a coating of an elastic material to improve user comfort.

The thickness of said coating at the top of a pad 21 is preferably less than the thickness of the coating between two pads 21.

Different thickness profiles of the coating layer 610 are shown in FIGS. 6 to 8B representing a section plane of a mouthpiece 1 along a plane perpendicular to the surface of the conduction plate 620.

These figures illustrate the armature of the conduction plate 620 comprising pads or ridges 621. The coating layer preferably comprises an elastic material. Preferably, the conduction plate 620 comprises flat portions 622 or substantially flat portions between two pads 621.

The pads 621 shown have a concave shape. The pads can also have a spherical or half-spherical shape, a cylindrical or rectangular shape projecting from the surface 622 of the plate conduction 620. The spherical or concave shape advantageously allows it to cooperate with the groove of a tooth.

Figure 6:
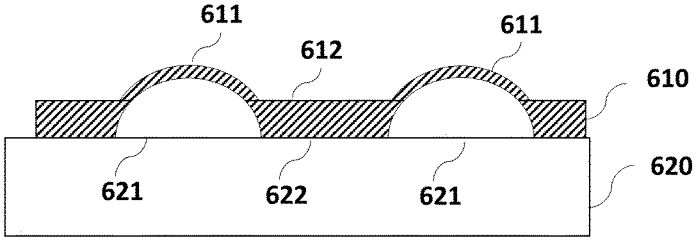
FIGS. 6-8B show different thickness profiles of the coating layer according to different embodiments of the invention.

In a first example illustrated in FIG. 6, the coating layer comprises the thickness of coating 611 in contact with the pad 621 smaller than the thickness of the coating 612 in contact with the surface 622 of the conduction plate 620.

Preferably, the thickness of the coating 611 in contact with the pad 621 is 2 to 10 times less than the thickness of the coating 612 in contact with the surface 622 between two pads 621.

In this first example, the outer surface of the coating layer 610 is curved at the level of the pads 621.

One advantage of this profile is to find a good compromise between the quality of bone conduction of the signal from the vibrating element and the comfort in the user's mouth.

Figure 7:
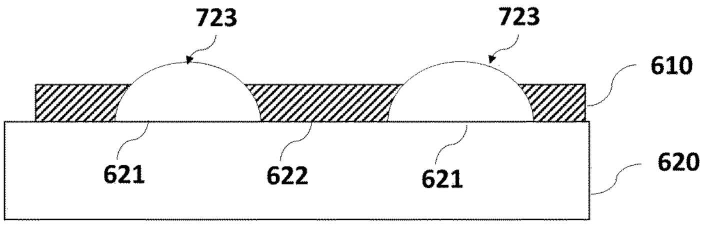

In a second example illustrated in FIG. 7, the top 723 of the pad 621 protrudes through the coating layer 610. The thickness of the coating layer in a zone comprising the top 723 of the pad 621 is then zero.

The thickness of the coating layer 610 decreases until it becomes zero at the level of the top 723 of the pad 621.

In this example, the coating layer 610 preferably forms a flat or substantially flat surface through which the pads 621 of the conduction plate 620 protrude.

One advantage of this embodiment is to optimize the quality of bone conduction.

Figure 8A:
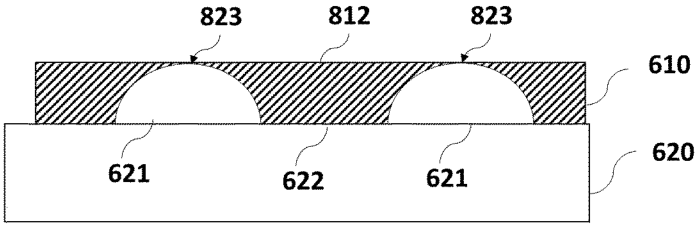

In a third example illustrated in FIG. 8A, the top 823 of the pad 621 is flush with the surface of the coating layer 610. The thickness of the coating layer 610 at the top of the pad is then zero or substantially zero. Preferably, the thickness of the coating layer 812 between two pads 621 is equal or substantially equal to the height of a pad 621. In another alternative mode not shown, the thickness of the coating layer between two pads is less than the height of the top of a pad 823.

Figure 8B:
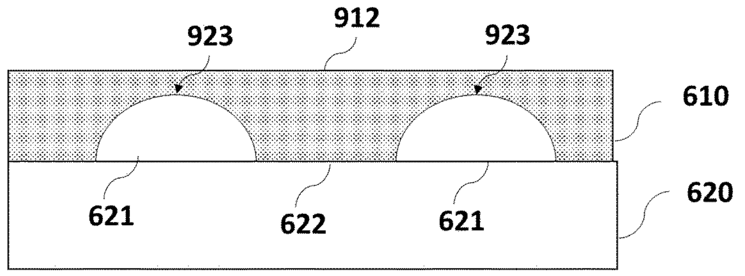

In a fourth example shown in FIG. 8B, the coating layer 610 has a flat or substantially flat surface and the thickness of the coating layer above the top of the pads 923 and less than the thickness of the coating layer between two pads 912.

One advantage of this third example is to obtain a better compromise between the quality of bone conduction between the plate 620 and the user's teeth and the comfort of the user in which the quality of bone conduction is favored.

The coating layer comprises an elastic material. Here, the term "elastic" must be understood in opposition to the rigidity of the conduction plate. In other words, the Young's modulus of the coating layer material is lower than that of the conduction plate material.

Preferably, the coating layer comprises a silicone plastic material, also known as polysiloxane, such as polydimethylsiloxane (known by the acronym "PDMS") or a derivative thereof. Alternatively, the coating layer comprises a material based on a thermoplastic elastomer such as a polyurethane. Such a material is advantageously biocompatible and easy to use in overmolding.

The armature includes a rigid plastic material allowing the conduction of the signal emitted by the vibrating element.

Preferably, the armature is composed of polypropylene ("PP"), acrylonitrile butadiene styrene ("ABS") or one of their derivatives. These two materials advantageously make it possible to create chemical adhesion with a coating layer based on silicone materials. Chemical adhesion makes it possible to increase the seal between the reinforcement and the coating layer. The thermoplastic elastomer-based material is particularly selected to create chemical adhesion with the PP or ABS of the armature.

In one embodiment, the hardness of the reinforcement is between 10 and 30 shore A.

Figure 2:
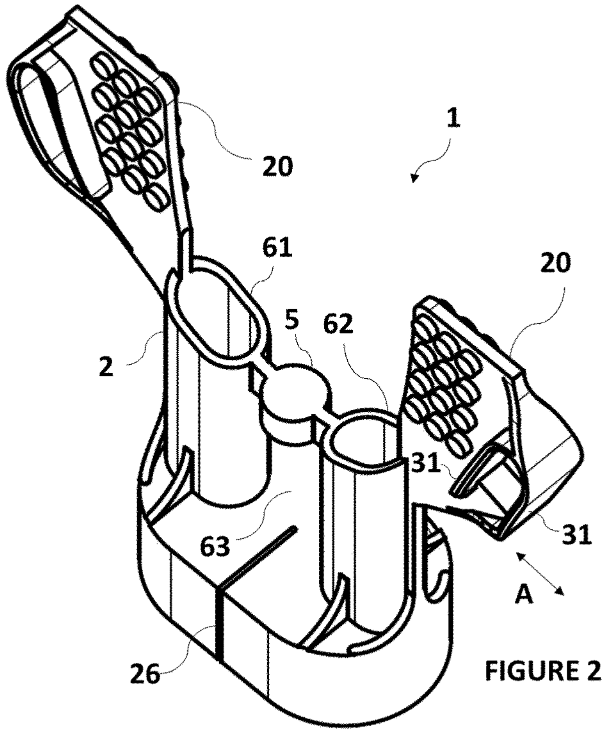
FIG. 2 is a perspective view of a mouthpiece according to an embodiment of the invention.

In one embodiment, the vibrating element 3 is arranged to vibrate in a vibration direction A. The vibrating element 3 is then encapsulated between at least two walls 31 in the vibration direction A and making it possible to transmit the vibrations of the vibrating element to the acoustic conduction plate 20. Preferably, and as illustrated in FIGS. 1 and 2, the direction of vibration A is substantially parallel to the plane of the acoustic conduction plate 20.

Figure 5:
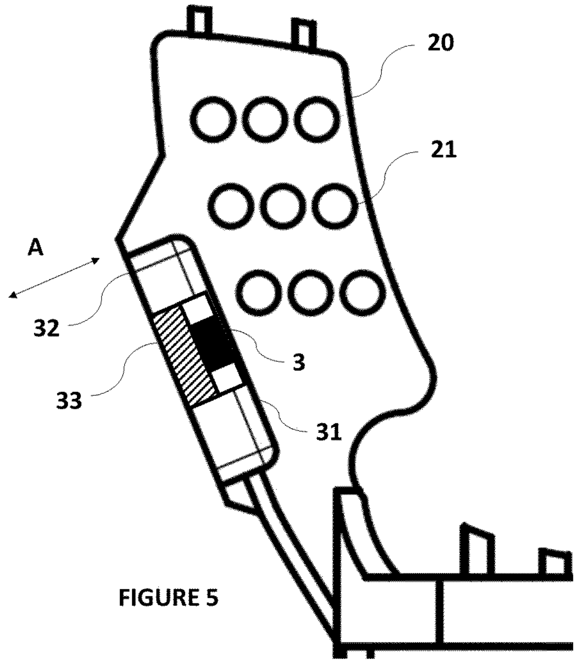
FIG. 5 is a view of a mouthpiece according to an embodiment of the invention showing the vibrating element.

In one embodiment illustrated in FIG. 5, the vibrating element is encapsulated, in its direction of vibration A, between a stop wall 31 and a second wall 32. In this mode, the device comprises a layer of absorbent material 33 arranged between the vibrating element 3 and the second wall 32. The absorbent material 33 is designed to absorb shocks between the vibrating element 3 and the second wall.

The absorbent material comprises, for example, a foam or an elastomer.

As the vibrating element 3 vibrates, it taps against the stop wall 31, transmitting vibrations from the vibrating element 3 to the conduction plate.

The advantage of the absorbent material layer 33 is to reduce vibration transmission between the vibrating element 3 and the conduction plate 20 via the second wall 32. The layer of absorbent material advantageously provides a space in which the vibrating element has sufficient space to vibrate while being in direct contact with a wall to transmit vibrations to the conduction plate. The absorbing material thus allows the vibrating element to have at least one degree of freedom relative to the wall. The absorbing material also enables the material to remain in contact with the abutment wall when the vibrating element is at rest.

In addition, the absorbent material advantageously reduces a phase shift effect between the vibrations transmitted to the conduction plate by the abutment wall 31 and the second wall 32.

A further advantage is to create a restoring force towards the stop wall 31 and the movement between the two walls in a simpler, more reliable and less expensive manner than in the prior art.

In an alternative embodiment, the vibration direction A can be perpendicular to the plane of the acoustic conduction plate 20.

Microphone

The mouthpiece 1 further comprises a microphone 5. The microphone 5 makes it possible to generate an electrical signal depending on the voice of the diver. The microphone 5 can be at least partially integrated into the elastic coating of the armature 2 and can be protected by at least one protective wall arranged in front of the microphone sensor. Advantageously, the protective wall advantageously makes it possible to reduce the difficulties of integrating the microphone into the coating during the armature overmolding stage. The protective wall protects the sensor from overmolding. In one embodiment, the microphone, or at least its detection face, is embedded in a protective layer. Advantageously, the protective layer protects the microphone's detection face and prevents it from being perforated when the armature is overmolded with the elastic material to form the coating layer.

Preferably, the microphone is enclosed in a receptacle 51 of the armature, said receptacle comprising at least one face protecting the sensing face of the microphone during the overmolding of said armature.

Mouthpiece 1 may further comprise signal transmission means connected to microphone 5 and/or vibrating element 3. The transmission means may comprise electronic cables and/or a ribbon cable. These transmission means can be at least partially integrated into the elastic coating of the armature.

Figure 11:
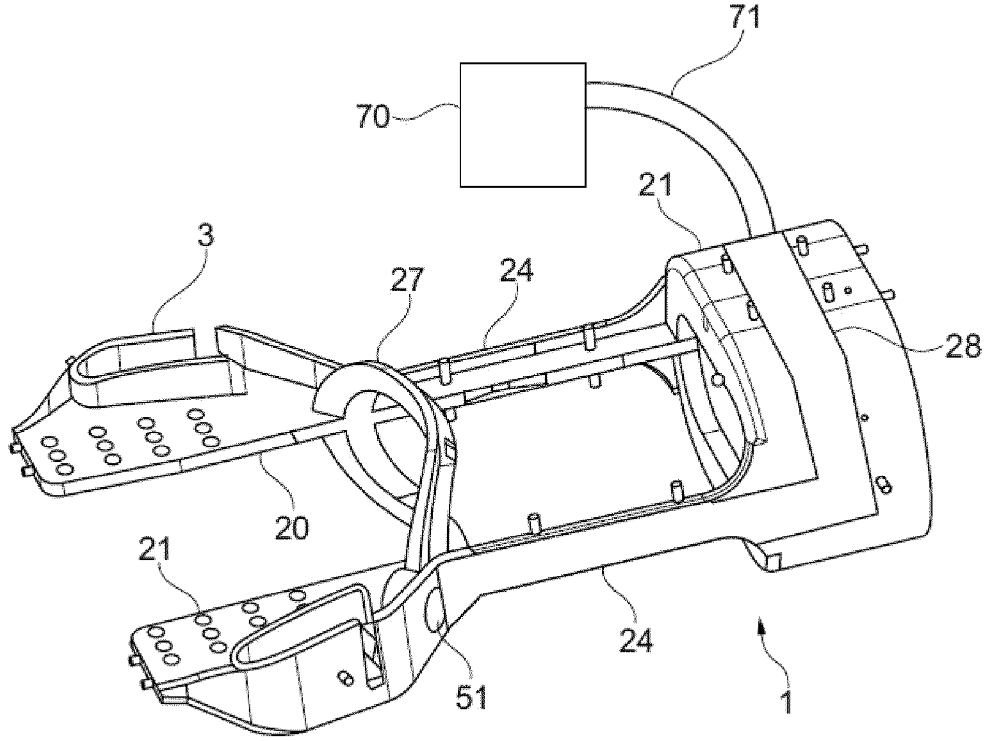
FIG. 11 represents an embodiment of the armature of the regulator mouthpiece.

In one embodiment, the transmission means comprise a ribbon cable. In an example illustrated in FIG. 11, the ribbon cable 28 is electrically connected to the microphone 5. The ribbon cable is also connected at least to the vibrating element 3. The ribbon cable is also connected to a remote communication device 70. For example, the ribbon cable can be connected to an electric cable electrically connecting the ribbon cable 28 to the remote communication device 70.

The ribbon cable is designed to be arranged on the armature before being covered by a coating layer at the same time as the armature during the overmolding step. Preferably, the ribbon cable is fixed to the armature by an adhesive layer such as glue. Very preferably, the ribbon cable comprises an adhesive face. The adhesive side can be covered with a protective film. To carry out the assembly, the protective film is removed and the tablecloth is glued against the armature while maintaining the adhesive side of the tablecloth against the armature.

In a final step, the armature comprising the ribbon cable is overmolded by the coating layer. Such a manufacturing process is advantageously faster, more reliable and less expensive.

As shown in FIG. 10, the ribbon cable has a geometry to at least partially surround the first portion 23 of the armature and to run along the arms 24 of the armature to the microphone and/or to the element vibrating arranged at the level of the conduction plate 20.

The remote communication device 70 may include any device capable of transmitting and/or receiving a signal, particularly in a marine environment.

In a non-limiting manner, the remote communication device 70 may include an acoustic communication, radio-communication, Bluetooth, Wi-Fi device.

Air Passage Lumens

A second embodiment of the invention is described below with reference to FIG. 2 and FIG. 3.

FIG. 2 is a perspective view of a mouthpiece according to a second embodiment of the invention, in which the coating is not shown for the sake of clarity.

Figure 3:
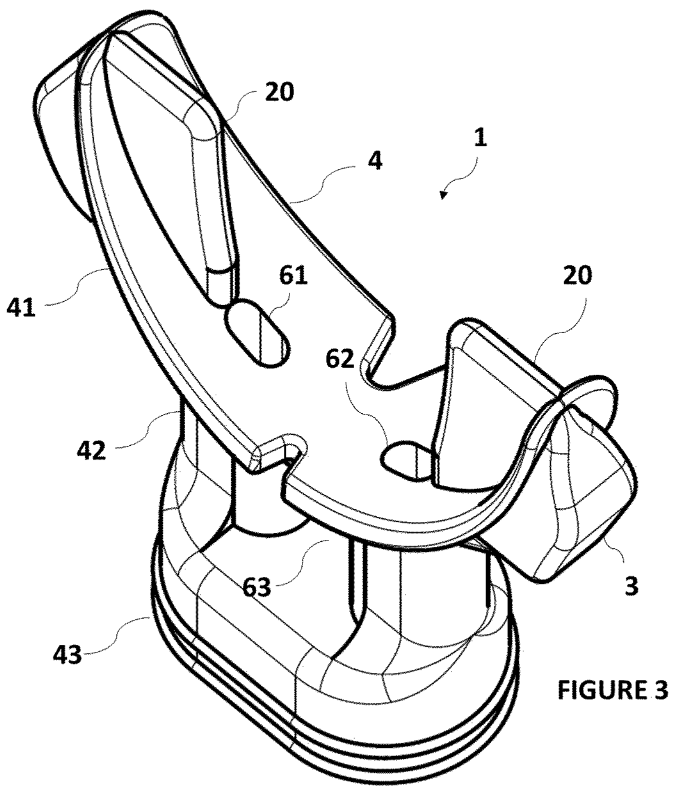
FIG. 3 is a perspective view of a mouthpiece according to an embodiment of the invention.

FIG. 3 is a perspective view of a mouthpiece according to the second embodiment of the invention, in which the coating is shown.

The mouthpiece 1 according to this second embodiment of the invention is similar to the mouthpiece of the first embodiment. However, the labial portion 42 includes two air passage lumens (61 and 62) instead of just one. In addition, the labial portion 42 includes a recess 63 between the two lumens 61 and 62. Advantageously, this recess 63 allows greater freedom for the diver's lips, thereby improving the intelligibility of speech recorded by the microphone. Recess 63 can be through, that is to say that the recess 63 between the two lumens opens onto the other side of the labial portion 42. In this embodiment, the mouthpiece advantageously allows contact between the lower and upper lips of the diver, further increasing the intelligibility of the speech recorded by the mouthpiece's microphone 5.

Preferably, the recess is arranged to face the center of the lips of a user wearing the mouthpiece 1.

Figure 4:
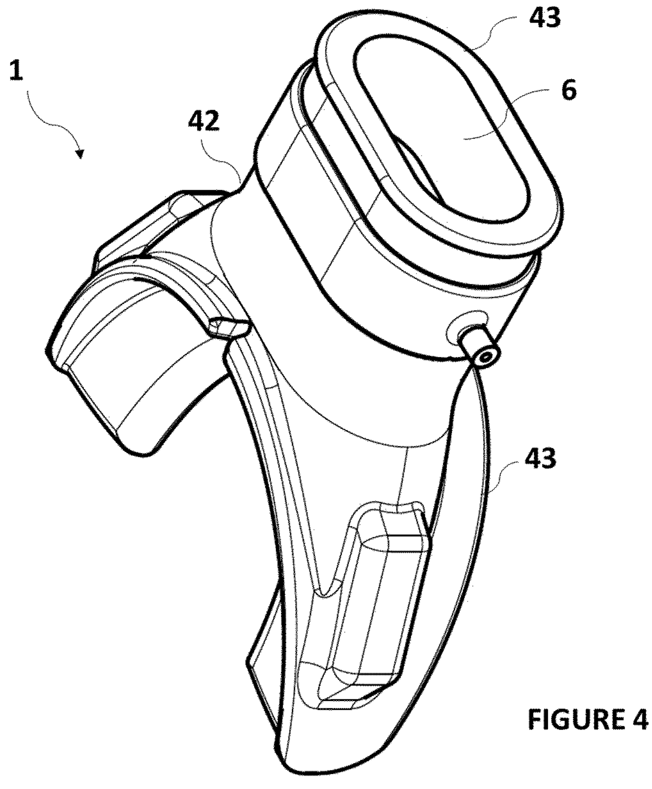
FIG. 4 is a perspective view of a mouthpiece according to an embodiment of the invention.

In an alternative embodiment illustrated in FIG. 4, the mouthpiece 1 comprises a single air passage lumen 6 and the labial portion 42, between the labial stop 43 and the connection means 43, has a deformable section.

Deformable Labial Portion

FIG. 4 is a perspective view of the device according to a third embodiment of the invention.

In this mode, the deformable section of the labial portion allows movement of the labial walls 421 of the labial portion 42 between a first configuration in which the opposite walls of the labial portion are not in contact, so as to allow air to pass through. by the air passage lumen 6 and a second configuration in which the opposite labial walls 421 of the labial portion are in contact.

The first configuration can be obtained, by the pressure of the air through the lumen when the subject inhales or exhales, pushing the walls of the labial portion in opposite directions.

The second configuration can be obtained by pressure of the lips, in particular on the labial walls 421 on either side of the labial portion until contact between the two opposite walls.

The labial portion is designed to allow passage between the first and the second by elastic deformation of these labial walls 421.

This deformation advantageously allows more freedom to be given to the diver's lips and thus improves the intelligibility of speech recorded by the microphone. In this embodiment, the mouthpiece advantageously allows indirect contact between the lower and upper lips of the diver, further enhancing the intelligibility of the speech recorded by the mouthpiece's microphone 5.

Figure 9:
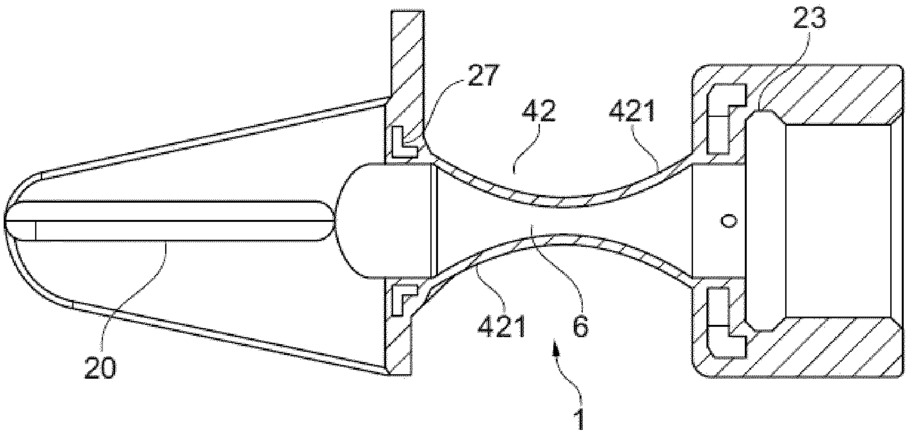
FIG. 9 represents a sectional view of a mouthpiece according to another embodiment.

FIG. 9 represents a sectional view of a mouthpiece according to another embodiment.

In this embodiment, the labial walls extend from the first portion 23 of the armature to the second portion 27 of the armature, thus forming the lumen 6 allowing air to pass through. Preferably, the first portion 23 and the second portion 27 comprise an annular or tubular section, and the labial wall extends from said annular section of both portions (the first and the second portion).

Preferably, the labial walls 421 are arranged around the lateral arms (which thus serve as mechanical support for the flexible labial walls.

Preferably, the labial walls 421 have a concave shape at rest from the outside of the mouthpiece. In other words, the spacing between the two labial walls has a decreasing or strictly decreasing profile from the first portion 23 of the armature and from the second portion to a point of inflection (for example in the middle of the segment between the first portion and the second portion).

To achieve this shape, the length of each labial wall is greater than the distance between the first and second portions.

This advantageously allows the user to deform the labial portions by reducing the force to be applied.

Part of the displacement of the wall is made without elastic deformation of the wall.

The labial walls allowing such a shape to be achieved can be made by molding.

Figure 12:
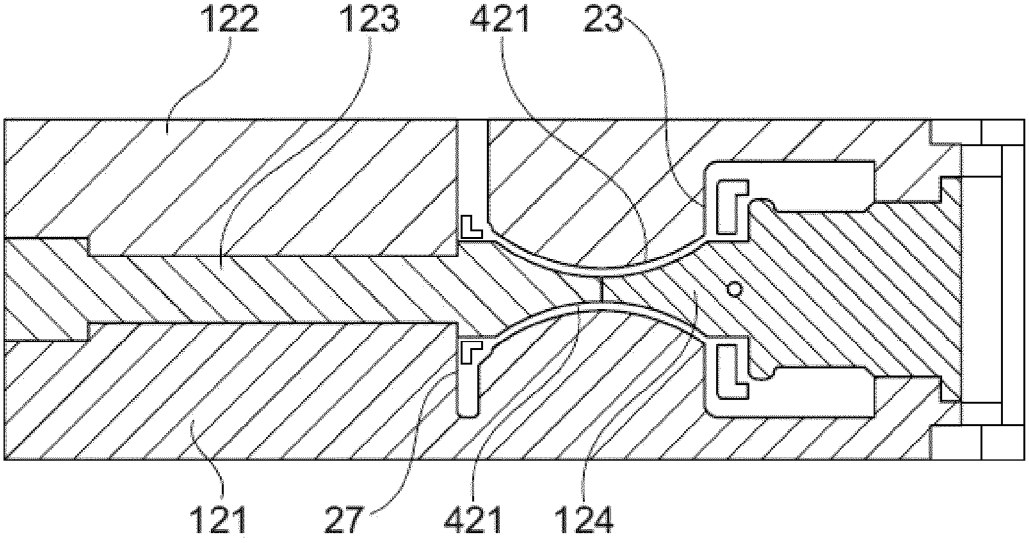
FIG. 12 represents an embodiment of the armature placed in a molding system.

An armature as described previously is placed in a molding system illustrated in FIG. 12.

The molding system is designed to mold a thermoelastic plastic material between the first portion 23 and the second portion 27 of the armature.

The armature as described above is placed between two main molds 121 and 122 designed to receive said armature.

Two additional molding pieces 123 and 124, not integral with each other, are inserted between the two portions 23, 27 of the armature, one facing the other, to form the lumen for air passage.

Preferably, these two additional molding parts 123, 124 are in contact with each other to form two concave surfaces from the first portion 23 of the armature to the second portion 27 of the armature. These concave surfaces cooperate with complementary surfaces of the main molds 121 and 122 to form the lip walls 421 by plastic injection.

The two additional molds 123, 124, inside the air passage lumen, are not integral so as to be able to remove each additional mold from one side of the air passage lumen.

Preferably, the additional molds are in contact with each other at a point where the height of the lumen section is lowest.

This advantageously allows the removal of each mold from a different side of the air passage lumen after injection.

The invention thus aims to protect a method of manufacturing a mouthpiece as described above.

The invention also relates to any type of communication device intended to be inserted into the mouth of a subject.

The mouthpiece should not be limited to only scuba regulator mouthpieces. For example, the mouthpiece of a communication device according to the invention may relate to a mouthguard.

The invention claimed is:

1. A communication device comprising a mouthpiece intended to be worn in the mouth of a user, the mouthpiece comprising:

- an acoustic conduction plate intended to be bitten by the user;
- a vibrating element configured to convert an audio input into an acoustic output, the vibrating element being coupled to the acoustic conduction plate so as to transmit said acoustic output to said plate;
- a labial portion to accommodate the user's lips,
- a lumen for passing air through the labial portion and formed at least in part by walls of the labial portion, wherein the labial portion is configured so that said walls of the labial portion are deformable between a first configuration in which opposite walls of the labial portion are not in contact, so as to allow air to pass through the lumen, and a second configuration in which the opposite walls of the labial portion are in contact, and wherein exterior surfaces of the labial walls have a concave shape at rest, and
- an armature comprising:
  - a first portion intended to be connected to a regulator;
  - a second portion connected to the acoustic conduction plate;
  - at least one rigid lateral connection arm extending from the first portion to the second portion of the armature; and wherein the labial walls extend from the first portion to the second portion of the armature by covering the at least one rigid lateral connection arm, wherein the first portion and/or the second portion comprises an annular section from which the labial walls extend.

2. The communication device according to claim 1, wherein the acoustic conduction plate intended to be bitten by the user comprises a plurality of ridges, wherein the acoustic conduction plate comprises an elastic coating and a thickness of the elastic coating at a top of a ridge of the plurality of ridges is less than a thickness of the elastic coating between two ridges of the plurality of ridges.

3. The communication device according to claim 1, wherein the device further comprises a microphone for capturing the voice of the user.

4. The communication device according to claim 3, wherein the microphone is at least partially integrated into an elastic coating of the mouthpiece.

5. The communication device according to claim 3, further comprising signal transmission means electrically connected to the vibrating element and/or to the microphone by an electrical ribbon cable, wherein the electrical ribbon cable is bonded to the armature and covered by overmolding with an elastic coating.

6. The communication device according to claim 1, wherein the labial walls are designed to be deformed to adapt to an air flow passing through the lumen.

7. The communication device according to claim 1, wherein the labial portion comprises two opposite labial walls, each intended to be in contact with a lip of the user.

8. The communication device according to claim 1, wherein the exterior surfaces of the labial walls have the concave shape at rest along a longitudinal direction of the lumen.

9. The communication device according to claim 1, wherein the exterior surfaces of the labial walls, from the first portion of the armature to the second portion of the armature, have the concave shape at rest.

10. The communication device according to claim 9, wherein a spacing between the labial walls has a decreasing profile from the first portion of the armature and from the second portion to a point of inflection.

11. The communication device according to claim 1, wherein the concave shape is a U-shape.

* * * * *